(12) United States Patent
Cai et al.

(10) Patent No.: US 12,293,737 B2
(45) Date of Patent: May 6, 2025

(54) TOUCH SUBSTRATE, DISPLAY APPARATUS AND DISPLAY SYSTEM

(71) Applicants: Beijing BOE Sensor Technology Co., Ltd., Beijing (CN); BOE TECHNOLOGY GROUP CO., LTD., Beijing (CN)

(72) Inventors: Shoujin Cai, Beijing (CN); Cheng Li, Beijing (CN); Chuncheng Che, Beijing (CN); Feng Liu, Beijing (CN); Tiansheng Li, Beijing (CN); Lin Zhou, Beijing (CN); Jie Zhang, Beijing (CN); Jin Cheng, Beijing (CN); Ziran Liu, Beijing (CN); Yingzi Wang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/569,671

(22) PCT Filed: Jun. 24, 2021

(86) PCT No.: PCT/CN2021/102024
§ 371 (c)(1),
(2) Date: Dec. 13, 2023

(87) PCT Pub. No.: WO2022/266921
PCT Pub. Date: Dec. 29, 2022

(65) Prior Publication Data
US 2024/0386863 A1  Nov. 21, 2024

(51) Int. Cl.
*G09G 3/36* (2006.01)
*G09G 3/3266* (2016.01)

(52) U.S. Cl.
CPC ......... *G09G 3/3677* (2013.01); *G09G 3/3266* (2013.01); *G09G 2310/0286* (2013.01); *G09G 2310/08* (2013.01); *G09G 2354/00* (2013.01); *G09G 2360/14* (2013.01)

(58) Field of Classification Search
CPC ......... G09G 3/3677; G09G 2310/0286; G09G 2310/08; G09G 2354/00; G09G 2360/14; G09G 3/3266
See application file for complete search history.

(56) References Cited

U.S. PATENT DOCUMENTS

| 2008/0055297 A1* | 3/2008 | Park | G02F 1/13318 438/30 |
| 2015/0213762 A1* | 7/2015 | Xia | G09G 3/3266 345/215 |

(Continued)

*Primary Examiner* — Roy P Rabindranath
(74) *Attorney, Agent, or Firm* — HOUTTEMAN LAW LLC

(57) ABSTRACT

A touch substrate, a display apparatus and a display system are provided. By rearranging and distributing transistors in each shift register, the number of transistors in a lateral direction is less than that of transistors in a longitudinal direction. That is a circuit structure of the shift register is designed to extend longitudinally, so that a size of the shift register in the lateral direction can be reduced, a narrow frame design is realized, and seamless splicing is favorably realized in a large-sized display panel.

18 Claims, 10 Drawing Sheets

(56) References Cited

U.S. PATENT DOCUMENTS

| | | | |
|---|---|---|---|
| 2015/0309644 A1* | 10/2015 | Sun | G06F 3/0443 |
| | | | 345/173 |
| 2016/0180785 A1* | 6/2016 | Jin | G09G 3/3614 |
| | | | 345/87 |
| 2017/0162122 A1* | 6/2017 | In | G09G 3/3291 |
| 2017/0193888 A1* | 7/2017 | Moon | G09G 3/36 |
| 2017/0278909 A1* | 9/2017 | Jeon | G06V 40/1347 |
| 2018/0018917 A1* | 1/2018 | Yoo | G09G 5/00 |
| 2019/0079330 A1* | 3/2019 | Yamamoto | G09G 3/3648 |
| 2019/0229133 A1* | 7/2019 | Li | G09G 3/3266 |
| 2022/0279158 A1* | 9/2022 | Hong | G02B 30/60 |

\* cited by examiner

TOUCH SUBSTRATE, DISPLAY APPARATUS AND DISPLAY SYSTEM

TECHNICAL FIELD

The present disclosure relates to the field of display technology, and in particular to a touch substrate, a display apparatus and a display system.

BACKGROUND

With the continuous development of communication technology, computer technology and electronic technology, mobile communication is developing from Human to Human (H2H) communication to Human to Machine (H2M) communication and Machine to Machine (M2M) communication, and the Internet of Everything becomes a necessary trend for the development of the mobile communication.

The Internet of Things (IoT) has been emerged in this context, and is considered to be the third wave of the world information industry after the computer and the Internet. The Internet of Things adopts the means of the informatization technology to promote the comprehensive upgrade of human life and production service, and has a wide application and development prospect and a strong industrial driving capability. European and American countries have brought development of the Internet of Things into the whole informatization strategy, and China has also definitely brought the development of the Internet of Things into the Outline of the National Medium and Long Term Science and Technology Development Program (2006-2020) and the 2050 National Industry Roadmap of China.

In the general background of the Internet of Things, the human-computer interaction appears to be particularly important, and the human-computer interaction is not only the infrastructure of the Internet of Things, but also the final target of the Internet of Things, for achieving the Internet of Everything serving human beings. The human-computer interaction refers to the fact that a user communicates with and operates a system through a human-computer interaction interface. A small object, such as a play button of a radio, and a big object, such as a dashboard on a plane or a control room of a power plant, are both used at every moment. There are various ways for implementing the human-computer interaction, such as a touch control based on a pressure, a resistance or a capacitance, or a face recognition based on the light, or a sound-based ultrasound, or a tactile feedback based on an electrostatic feedback or the like. The touch interaction of the consumer products, such as mobile phones and televisions, is widely applied at present, but the technology has a certain limitation. That is the interaction can be realized only by a contact-type touch control, which limits the range of application and cannot realize the remote touch interaction. A light touch control has been emerged in this context.

SUMMARY

Embodiments of the present disclosure provide a touch substrate, including: a base substrate including a photosensitive region and a frame region surrounding the photosensitive region; a plurality of photosensitive pixels in an array in the photosensitive region, each photosensitive pixel includes a non-visible light sensor and a driving transistor; and at least one gate driving circuit in the frame region, each of the at least one gate driving circuit includes a plurality of cascaded shift registers, an output terminal of each shift register is electrically connected to gate electrodes of driving transistors in at least one row of photosensitive pixels through at least one gate line, which extends along a first direction; each shift register includes a plurality of transistors; and in each shift register, the number of transistors arranged along a second direction is greater than the number of transistors arranged along the first direction, and the second direction is substantially perpendicular to the first direction.

In one possible implementation, in the touch substrate provided by the embodiments of the present disclosure, each shift register has a first length in the first direction and a second length in the second direction, and the first length is less than the second length.

In one possible implementation, in the touch substrate provided by the embodiments of the present disclosure, the second length is substantially equal to a center-to-center distance between two adjacent photosensitive pixels in the second direction.

In one possible implementation, in the touch substrate provided by the embodiments of the present disclosure, the touch substrate includes two gate driving circuits in the frame region on both sides of an extending direction of the at least one gate line; the first length is less than half of a center-to-center distance between two adjacent photosensitive pixels in the first direction.

In one possible implementation, in the touch substrate provided by the embodiments of the present disclosure, the center-to-center distance between two adjacent photosensitive pixels in the first direction and the center-to-center distance between two adjacent photosensitive pixels in the second direction each is in a range from 3 mm to 5 mm.

In one possible implementation, in the touch substrate provided by the embodiments of the present disclosure, a width direction of a channel region of each transistor in each shift register extends along the first direction, and a length direction of the channel region extends along the second direction.

In one possible implementation, in the touch substrate provided by the embodiments of the present disclosure, each shift register includes: a first output transistor including at least two sub-transistors arranged along the second direction and connected with each other in parallel; and a gate electrode of each sub-transistor is electrically connected to a first node, a first electrode of each sub-transistor is electrically connected to a clock signal terminal, a second electrode of each sub-transistor is electrically connected to a first output signal terminal, and the first output signal terminal is electrically connected to a corresponding gate line.

In one possible implementation, in the touch substrate provided by the embodiments of the present disclosure, a channel width of each sub-transistor in the first direction is not greater than 1000 μm.

In one possible implementation, in the touch substrate provided by the embodiments of the present disclosure, a maximum amplitude of a clock signal provided by the clock signal terminal is between 15V and 25V.

In one possible implementation, in the touch substrate provided by the embodiments of the present disclosure, each shift register further includes: an input transistor, a reset transistor, and a control circuit arranged along the second direction; a gate electrode and a first electrode of the input transistor are both electrically connected to an input signal terminal, and a second electrode of the input transistor is electrically connected to the first node; a gate electrode of the reset transistor is electrically connected to a reset signal terminal, a first electrode of the reset transistor is electrically connected to a first power supply signal terminal, and a second electrode of the reset transistor is electrically connected to the first node; and the control circuit is electrically connected to the first node, the first output signal terminal, and at least one control signal terminal, respectively, and is configured to control potentials at the first node and the first output signal terminal in response to a signal at the at least one control signal terminal, respectively.

In one possible implementation, in the touch substrate provided by the embodiments of the present disclosure, the control circuit includes two control sub-circuits, the at least one control terminal includes two different control signal terminals, and the two control sub-circuits are electrically connected to the different control signal terminals, respectively, transistors with a same function in the two control sub-circuits are arranged side by side in the first direction, and transistors with different functions in the two control sub-circuits are arranged in the second direction.

In one possible implementation, in the touch substrate provided by the embodiments of the present disclosure, each shift register further includes: a second output transistor; and a gate electrode of the second output transistor is electrically connected to the first node, a first electrode of the second output transistor is electrically connected to the clock signal terminal, a second electrode of the second output transistor is electrically connected to a second output signal terminal, which is configured to be electrically connected to an input signal terminal in a shift register of a next stage and a reset signal terminal in a shift register of a previous stage.

In one possible implementation, in the touch substrate provided by the embodiments of the present disclosure, the second output transistor and the first output transistor are arranged along the second direction, and a channel width of the second output transistor in the first direction is less than a channel width of each sub-transistor in the first direction.

In one possible implementation, the touch substrate provided by the embodiments of the present disclosure further includes: at least one read circuit arranged in the frame region and located at a side different from a side where the at least one gate driving circuit is located, and each of the at least one read circuit is electrically connected to first electrodes of driving transistors in at least one column of photosensitive pixels of the plurality of photosensitive pixels through at least one corresponding data line extending along the second direction.

In one possible implementation, the touch substrate provided by the embodiments of the present disclosure further includes: a non-visible light antireflection film on a side of the non-visible light sensor away from the base substrate, and completely covering the photosensitive region.

In one possible implementation, in the touch substrate provided by the embodiments of the present disclosure, the non-visible light antireflection film is made of a black matrix material which selectively transmits non-visible light.

In another aspect, embodiments of the present disclosure further provide a display apparatus, including: a display module; and at least one touch substrate, each of which is the touch substrate provided by the embodiments of the present disclosure, and the at least one touch substrate is on a side of the display module away from a display surface.

In one possible implementation, in the display apparatus provided by the embodiments of the present disclosure, the at least one touch substrate includes a plurality of touch substrates which are arranged adjacent to each other, and a sum of widths of frame regions of two adjacent touch substrates in the first direction is less than a center-to-center distance between two adjacent photosensitive pixels in the first direction.

In one possible implementation, the display apparatus provided by the embodiments of the present disclosure further includes a backlight module; the display module is a liquid crystal display module, the display module is located on a light outgoing side of the backlight module, and the at least one touch substrate is located in the backlight module.

In one possible implementation, in the display apparatus provided by the embodiments of the present disclosure, the backlight module includes: a backlight source and a reflective sheet, a light guide plate, and a diffusion sheet which are stacked; and the backlight source is on at least one side of the light guide plate, and the touch substrate is between the light guide plate and the diffusion sheet.

In another aspect, embodiments of the present disclosure further provide a display system, including a display apparatus and a non-visible light emitter, and the display apparatus is the display apparatus provided by the embodiments of the present disclosure.

DETAIL DESCRIPTION OF EMBODIMENTS

Figure 1:
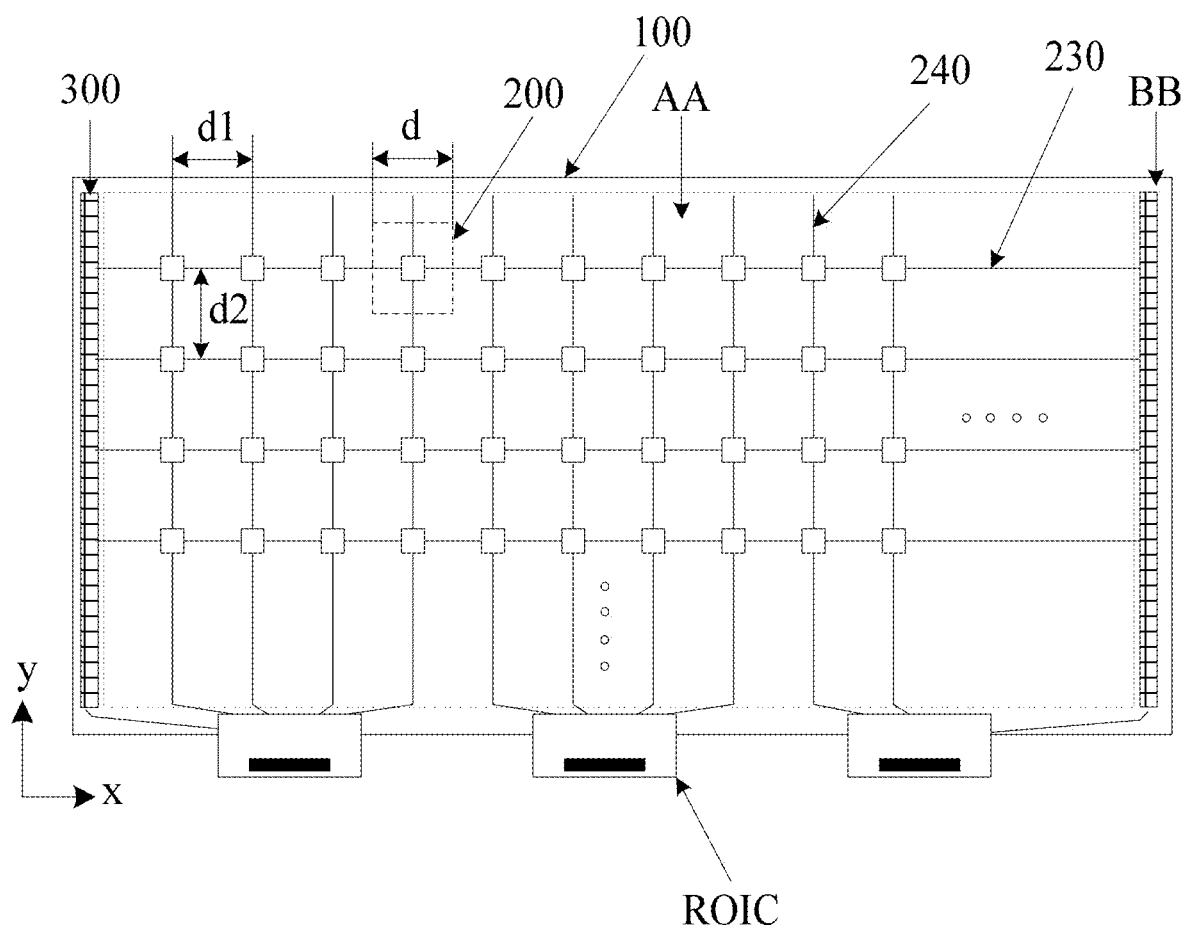
FIG. 1 is a schematic diagram of a structure of a touch substrate according to embodiments of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It should be noted that the sizes and shapes of various elements shown in the drawings are not necessarily drawn to scale and are merely schematic representations of the present disclosure. Like or similar elements or elements having like or similar functions are denoted by like or similar reference symbols throughout the various figures. It is to be understood that the described embodiments are only a few, not all of, embodiments of the present disclosure. All other embodiments, which can be derived by a person skilled in the art from the embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms "first", "second", and the like used in the description and the claims of the present disclosure are not intended to indicate any order, quantity, or importance, but rather are used for distinguishing one element from another. The term "comprising/comprise", "including/includes", or the like, means that the element or item preceding the term contains the element or item listed after the term and its equivalent, but does not exclude other elements or items. The terms "inner", "outer", "upper/on", "lower/under", "left", "right", and the like are used only for indicating relative positional relationships, and when the absolute position of an object being described is changed, the relative positional relationships may also be changed accordingly.

The remote interaction can be realized by adopting a near infrared light sensor, has a huge application prospect in fields such as the smart screen (such as TV & whiteboard), or Gaming MNT or the like, and has technical characteristics including the accurate positioning in a millimeter level, and a response speed in a millisecond level, and the display flexibility and the like, and realize the soaring accurate non-delay positioning operation and the non-contact handwriting effect.

An active layer of a thin film transistor (TFT) device in a light touch panel is generally made of an a-Si material, which has a relatively low carrier mobility, so that a size of the TFT in a gate driving circuit is necessarily designed to be large, to obtain sufficient driving force. For a large-sized panel, the gate driving circuit generally adopts a 21T1C architecture, and is responsible for controlling a channel width of the TFT at an output signal end to be in an order of thousands of microns or even tens of thousands of microns. The conventional gate driving circuit adopts the structure that all TFTs are laterally arranged (i.e., in a horizontal direction), a frame of the panel reaches a value in a range from 4 mm to 5 mm, so that the narrow frame design cannot be realized. With the continuous expansion of product application, when the light touch panel is applied to a product with a larger size and needs to be spliced, the excessively wide frame affects user experience.

In order to at least solve the above technical problems in the related art, embodiments of the present disclosure provide a touch substrate, which is particularly suitable for the field of the remote large-sized non-visible light (e.g., near infrared light) interaction technology. As shown in FIGS. 1, 2, 3a and 7, the touch substrate may include the following.

A base substrate 100 includes a photosensitive region AA and a frame region BB surrounding the photosensitive region AA.

A plurality of photosensitive pixels 200 are arranged in an array in the photosensitive region AA, and each photosensitive pixel 200 may include a non-visible light sensor 210 and a driving transistor 220.

Gate driving circuits 300 are arranged in the frame region BB, each gate driving circuit 300 includes a plurality of cascaded shift registers GOA, an output terminal of each shift register GOA is electrically connected to gate electrodes of driving transistors 220 in at least one row of photosensitive pixels 200 through gate lines 230, and each gate line 230 extends along a first direction x.

Each shift register GOA includes a plurality of transistors T, and in each shift register GOA, the number of transistors T arranged along a second direction y is greater than the number of transistors T arranged along the first direction x, and the second direction y is substantially perpendicular to the first direction x. Generally, the first direction x is a horizontal direction (a lateral direction) and the second direction y is a vertical direction (a longitudinal direction), or vice versa. In some embodiments of the present disclosure, as an example, the first direction x is a horizontal direction and the second direction y is a vertical direction.

In the touch substrate provided in the embodiments of the present disclosure, the gate driving circuits 300 are generally disposed in the frame region BB on at least one of the left and right sides of the photosensitive region AA. The gate driving circuits 300 are disposed in the frame region BB on any one of the left and right sides of the photosensitive region AA, which is known as the single-side driving. The gate driving circuits 300 are disposed in the frame region BB on the left and right sides of the photosensitive region AA, which is known as the both-side driving. By rearranging and distributing the transistors T in the shift register GOA, the number of the transistors of the shift register GOA in the second direction y (i.e., the lateral direction) is less than that of the transistors in the first direction x (i.e., the longitudinal direction). That is the circuit structure of the shift register GOA is designed to extend longitudinally, so that a size of the shift register in the first direction x can be reduced, the narrow frame design is realized, and the seamless splicing is favorably realized in the application of a large-sized panel.

Figure 2:
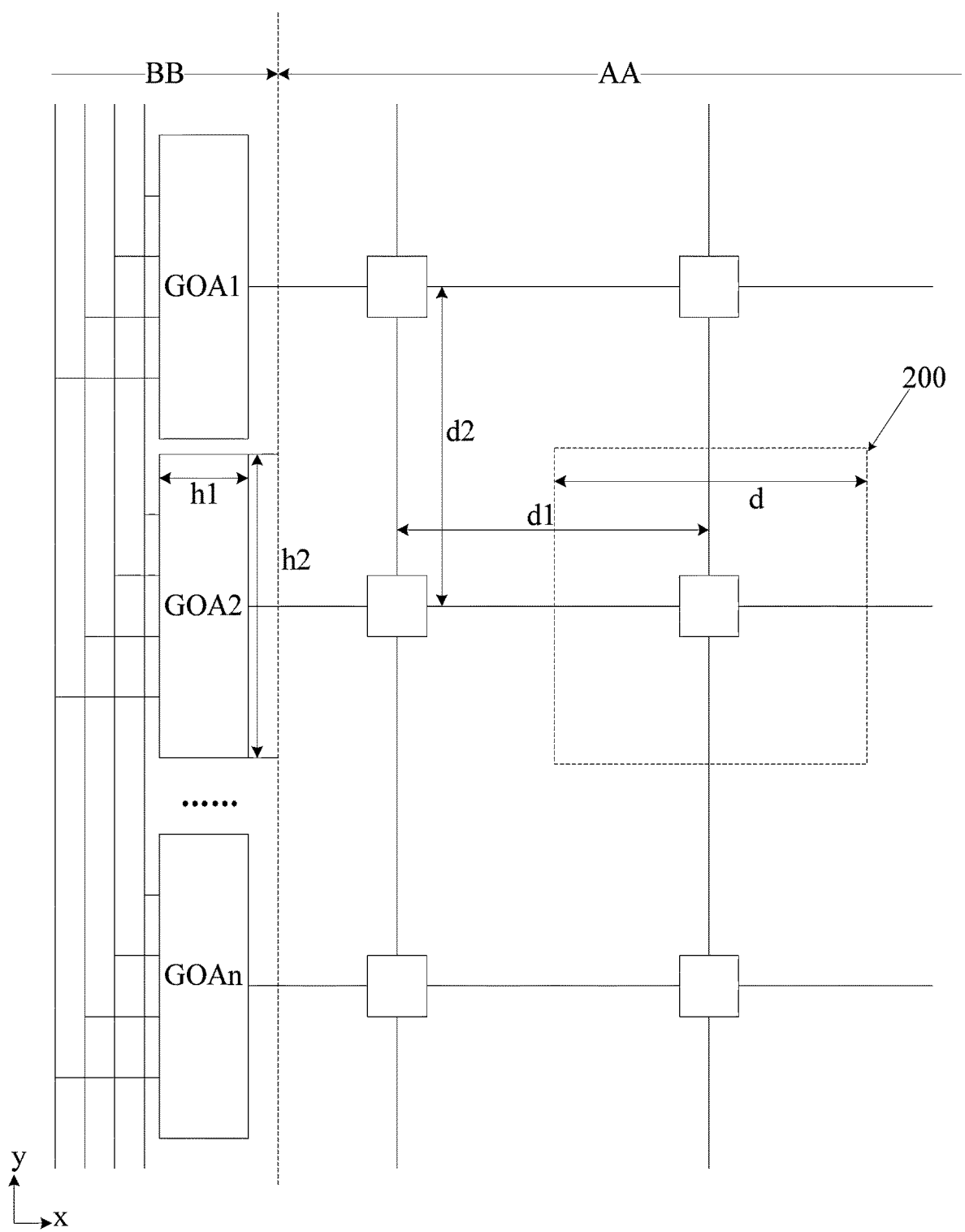
FIG. 2 is a schematic diagram of a part of another structure of a touch substrate according to embodiments of the present disclosure.

In some embodiments of the present disclosure, as shown in FIG. 2, each shift register GOA has a first length h1 in the first direction x and a second length h2 in the second direction y, and the first length h1 is less than the second length h2. By longitudinally designing the circuit structure of the shift register GOA, the number of transistors arranged in the lateral direction of each shift register GOA is reduced, the number of transistors arranged in the longitudinal direction of each shift register GOA is increased, and the size h1 of each shift register in the first direction x can be reduced to be less than h2, thereby reducing the size of the frame occupied by each shift register GOA.

It should be noted that the shift registers GOA include a plurality of signal lines extending along the second direction y and arranged along the first direction x in addition to the transistors in the first direction x, and the signal lines are used for providing required signals, such as a frame start signal, a clock signal, a low level signal, a control signal, etc., to the shift registers GOA. These signal lines also occupy the size of the frame, and h1 can be understood to be a size of the frame occupied by the transistors and the signal lines.

In some embodiments of the present disclosure, by designing the arrangement of the transistors in each shift register GOA, the longitudinal space can be utilized to the maximum, so that the second length h2 of each shift register GOA is substantially equal to a center-to-center distance d2 between two adjacent photosensitive pixels 200 in the second direction y, so as to minimize the size (i.e., the first length h1) of the shift register GOA in the first direction as much as possible.

In some embodiments of the present disclosure, as shown in FIG. 1, two gate driving circuits 300 are included and are respectively arranged in the frame region BB on both sides of an extending direction of each gate line 230. In order to achieve the seamless splicing in the application of the large-sized panel, the first length h1 may be less than half of the center-to-center distance d1 between two adjacent photosensitive pixels 200 in the first direction x. In this way, a sum of widths of frames between two adjacent touch substrates in the first direction x is less than the center-to-center distance d1 between two adjacent photosensitive pixels 200 in the first direction x, equivalently achieving the seamless splicing.

In some embodiments of the present disclosure, as shown in FIG. 1, a region occupied by each photosensitive pixel 200 may be approximately square, i.e., the center-to-center distance d1 between two adjacent photosensitive pixels 200 in the first direction x is approximately equal to a center-to-center distance d2 between two adjacent photosensitive pixels 200 in the second direction y. Specifically, the center-to-center distance between two adjacent photosensitive pixels 200 may be referred to as a side length d of the photosensitive pixel 200, or a pixel period or a pixel size.

Specifically, in the touch substrate provided by the embodiments of the present disclosure, a near infrared light emitter emits near infrared light with a wavelength in a range from 800 nm to 900 nm a size of a light spot is limited to be less than or equal to 5 mm, and the divergence of the light spot is not more than 5% at a distance less than or equal to 5 m. A transmitting distance and a receiving distance are each limited to be in a range of 0 m to 10 m from the screen. If each distance is too great, there is little significance according to the use scene. A transmitting power of the near infrared light emitter is limited to be less than or equal to 1 mw, so that the household injury prevention requirement (it is reported that the near infrared light with a high intensity can injure the iris of the eyes of a person) is met, and a signal intensity of a receiving end can be met. The non-visible near infrared light emitted in this way is projected on the touch substrate, and a large light spot necessarily (completely) covers the non-visible light sensors 210, so that the conversion of an optical signal to an electrical signal can be realized by the non-visible light sensors 210.

Based on this in the touch substrate provided in the embodiments of the present disclosure, as shown in FIG. 1, the side length d of each photosensitive pixel 200 may be in a range from 3 mm to 5 mm, that is the center-to-center distance d1 or d2 between two adjacent photosensitive pixels 200 in each of the first direction x and the second direction y is in a range from 3 mm to 5 mm, so as to match a spot size of a non-visible light emitter (e.g., the near infrared light emitter). At this time, the frame width on each of the left and right sides of the photosensitive region AA may be controlled to be less than 1.5 mm, so that the sum of the frame widths between two adjacent touch substrates in the first direction x is less than the center-to-center distance d1 between two adjacent photosensitive pixels 200 in the first direction x, thereby achieving the seamless splicing.

In some embodiments of the present disclosure, as shown in FIG. 1, a bisector of the center-to-center distance between two adjacent photosensitive pixels 200 is a boundary of each photosensitive pixel 200 (i.e., the side length of each photosensitive pixel 200 is equal to the center-to-center distance between the two adjacent photosensitive pixels 200), so that an area of each photosensitive pixel 200 may be equal to a square of the center-to-center distance between the two adjacent photosensitive pixels 200. For example, the center-to-center distance between the two adjacent photosensitive pixels 200 is in a range of the side length d of each photosensitive pixel 200, that is in a range from 3 mm to 5 mm, and correspondingly, the area of the photosensitive pixel 200 may be in a range from 3 mm×3 mm to 5 mm×5 mm, that is, 9 mm$^2$ to 25 mm$^2$.

In some embodiments of the present disclosure, as shown in FIG. 1, the touch substrate provided in the embodiments of the present disclosure may further include read circuits ROIC arranged in the frame region BB and located on a different side of the frame region BB from the gate driving circuits 300, each read circuit ROIC is electrically connected to first electrodes of the driving transistors 220 in at least one column of the photosensitive pixels 200 through data lines 240 extending along the second direction y. The number of the read circuits ROIC generally increases as a size of the product increases.

Figure 3A:
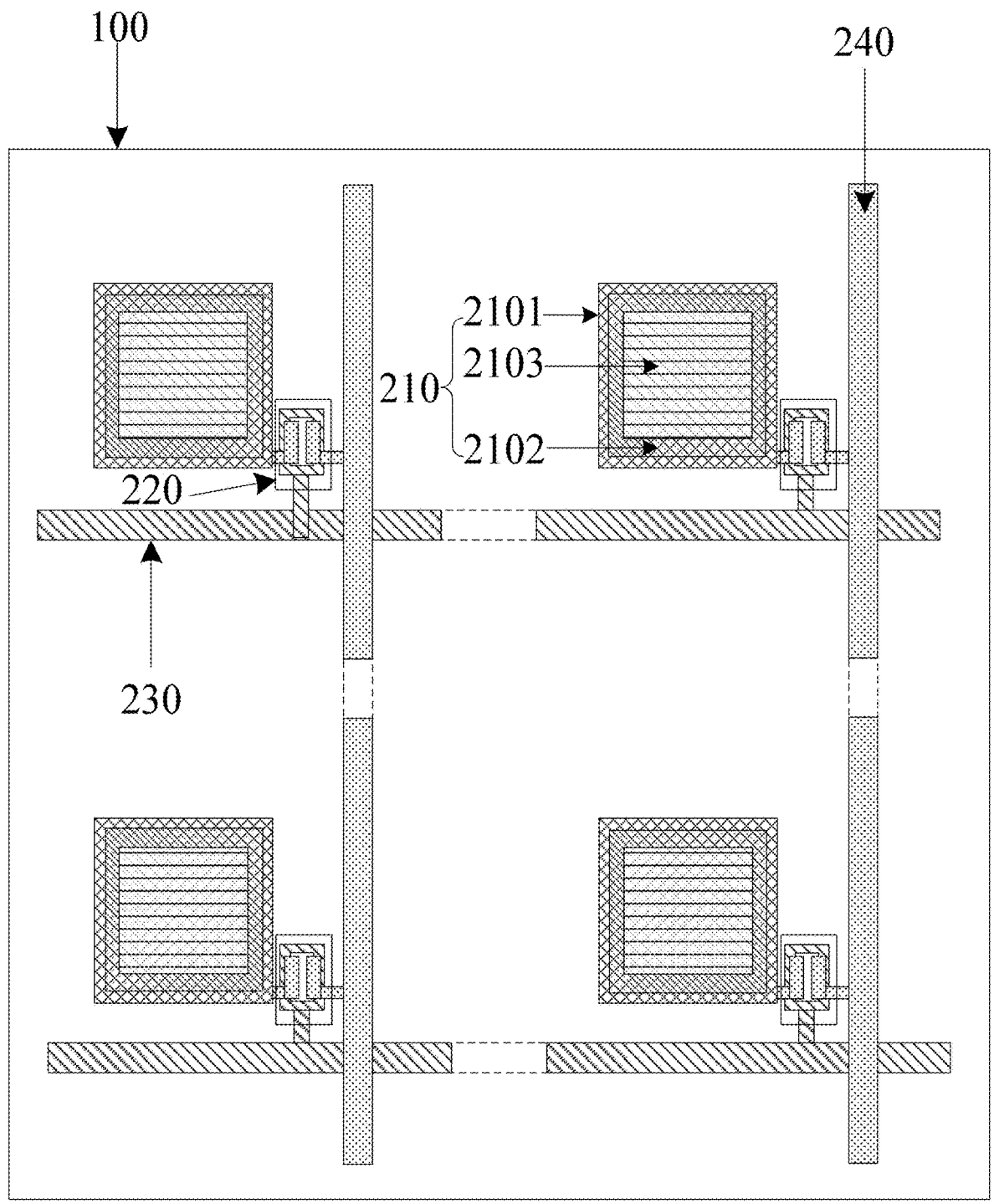
FIG. 3a is a schematic diagram of a part of another structure of a touch substrate according to embodiments of the present disclosure.
Figure 3B:
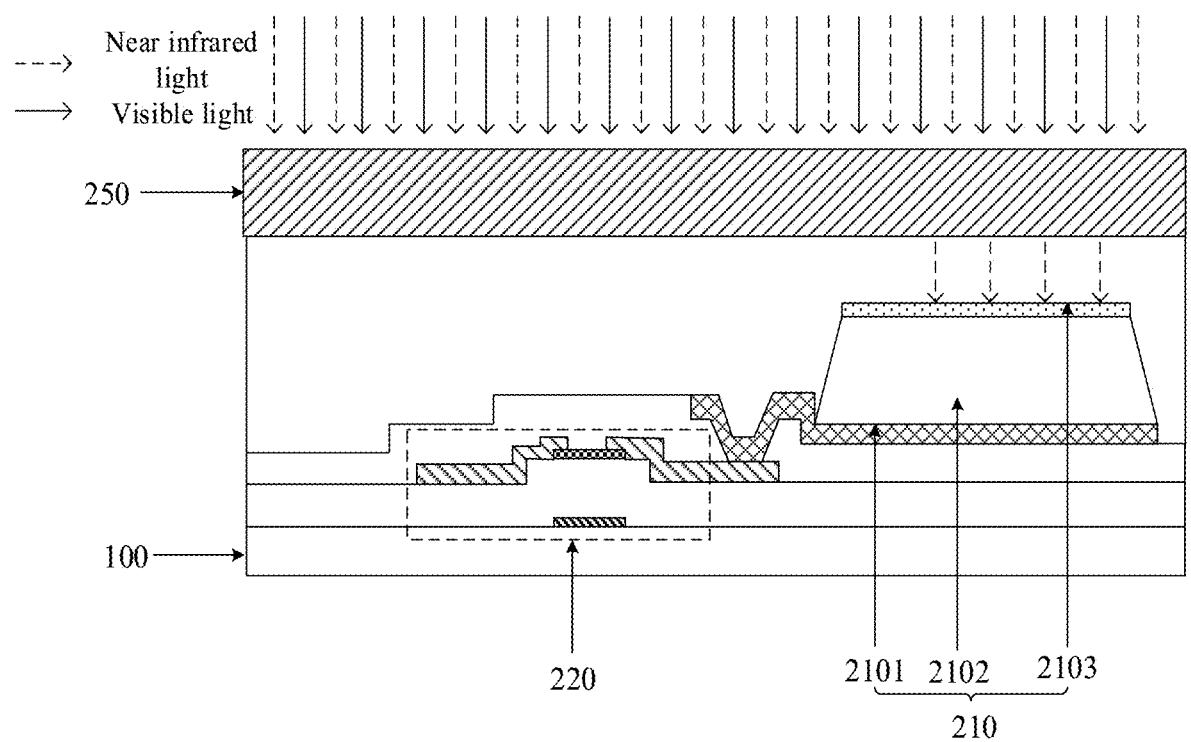
FIG. 3b is a schematic cross-sectional view of a structure of a photosensitive pixel according to embodiments of the present disclosure.

In some embodiments of the present disclosure, in the touch substrate provided in the embodiments of the present disclosure, as shown in FIG. 3b, each non-visible light sensor 210 may include a first electrode 2101, a photosensitive layer 2102, and a second electrode 2103, which are stacked, where the first electrode 2101 is located between the base substrate 100 and the photosensitive layer 2102 and is in direct contact with the photosensitive layer 2102, and the second electrode 2103 is in direct contact with the photosensitive layer 2102. The photosensitive layer 1022 may include a P-type amorphous silicon semiconductor layer, an intrinsic amorphous silicon semiconductor layer, and an N-type amorphous silicon semiconductor layer, which are stacked sequentially, the P-type amorphous silicon semiconductor layer is in direct contact with the second electrode 2103, and the N-type amorphous silicon semiconductor layer is in direct contact with the first electrode 2101.

In some embodiments of the present disclosure, in the touch substrate provided in the embodiments of the present disclosure, as shown in FIG. 3a, a gate electrode of each driving transistor 220 is electrically connected to the gate line 230, a first electrode of each driving transistor 220 is electrically connected to the data line 240, a second electrode of each driving transistor 220 is electrically connected to the first electrode 2101; each driving transistor 220 is controlled by the gate line 230 to be turned on or off, and a photocurrent read by the driving transistor 220 from the non-visible light sensor 210 is written by the data line 240 into the read circuit ROIC.

In some embodiments of the present disclosure, each non-visible light sensor 210 may be a near infrared sensor, and the near infrared sensor made of the amorphous silicon (a-si) material is sensitive to both the near infrared light band and the visible light band and have a strong absorption for the light in the near infrared light band and the visible light band, and particularly, have an absorption peak of the green light in the 550 nm band, which is up to 80%. The near infrared light emitter used in the present disclosure emits light in a band in a range from about 800 nm to 900 nm so that the visible light band becomes noise. In order to eliminate the influence of the noise, that is, in order to prevent the ambient light from interfering the light touch effect and prevent the non-visible light sensors 210 from being overexposed due to receiving the ambient light, as shown in FIG. 3b, the touch substrate provided in the embodiments of the present disclosure may further include: a non-visible light antireflection film 250 located on a side of the non-visible light sensors 210 away from the base substrate 100, and the non-visible light antireflection film 250 may selectively transmit the non-visible light (e.g., the near infrared light). For ease of manufacturing, the non-visible light antireflection film 250 may completely cover the photosensitive region AA.

In some embodiments of the present disclosure, a material of the non-visible light antireflection film 250 may be a black matrix (BM) material, which can selectively transmit the non-visible light (e.g., the near infrared light) and block the non-visible light in other bands (e.g., a non-near infrared band) and the visible light.

In some embodiments of the present disclosure, a width direction of a channel region of each transistor T in each shift register GOA extends along the first direction x, and a length direction of the channel region extends along the second direction y. Therefore, a channel direction of each transistor T in the shift register is not changed, the performance consistency of devices is ensured, and the narrow frame design can be realized in combination with the longitudinal design of the circuit structure of the shift registers GOA, and the seamless splicing is favorably realized in the application of the large-sized panel.

Figure 4:
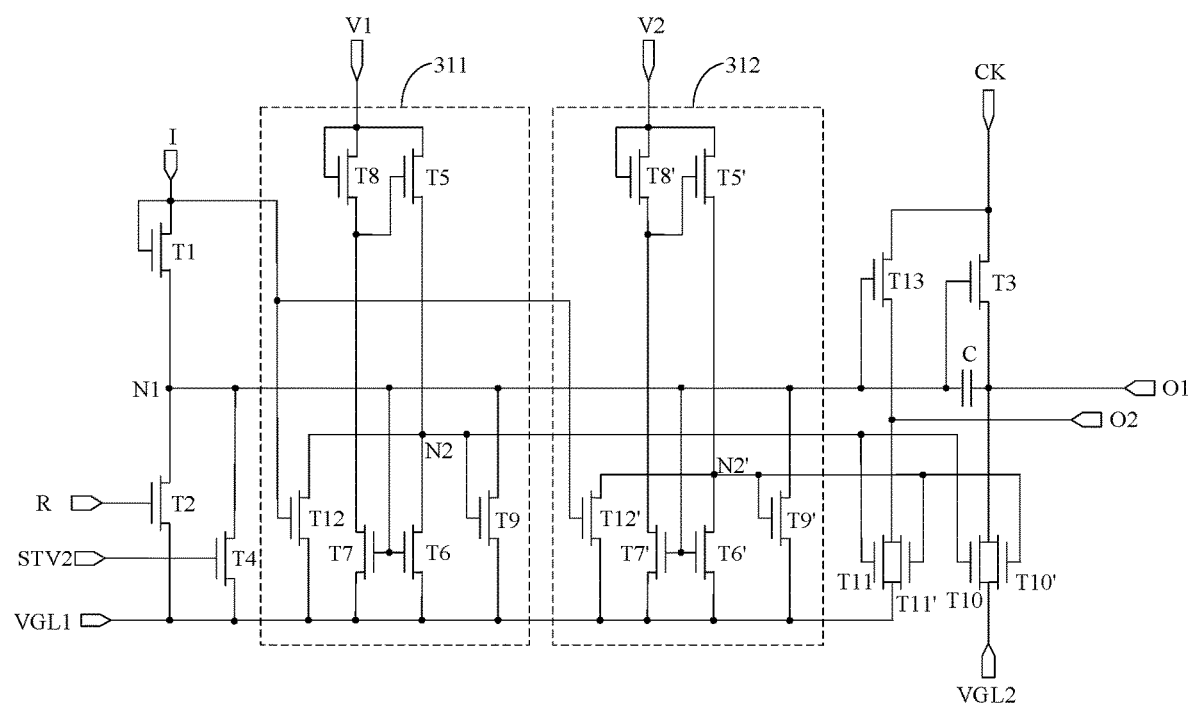
FIG. 4 is a schematic diagram of a circuit structure of a shift register in a touch substrate according to embodiments of the present disclosure.

Optionally, in the touch substrate provided in the embodiments of the present disclosure, as shown in FIG. 4, each shift register GOA specifically includes: a first output transistor T3 configured to control a first output signal terminal O1 connected to the gate line 230. According to TFT test data, in the conventional panel design, the first output transistor T3 is large-sized, and a width W of a channel region (a channel width W) of each first output transistor T3 is necessarily greater than 1000 μm, to ensure sufficient driving capability, but an oversized channel width causes a linearity between Ion and W/L to be poor. Even if all transistors T of each shift register GOA are arranged in the longitudinal direction, i.e., no other transistor is arranged side by side with the first output transistor T3 in the first direction x, the first length h1 of the shift register GOA cannot be further reduced because the channel width of the first output transistor T is greater than 1000 μm.

Figure 6:
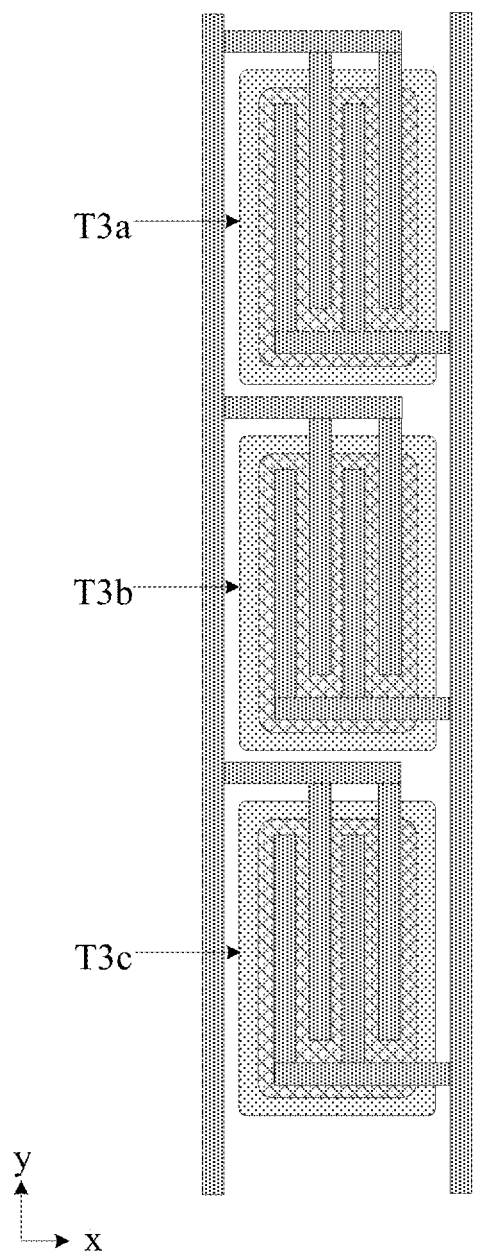
FIG. 6 is a schematic diagram of a structure of a first output transistor in a touch substrate according to embodiments of the present disclosure.
Figure 7:
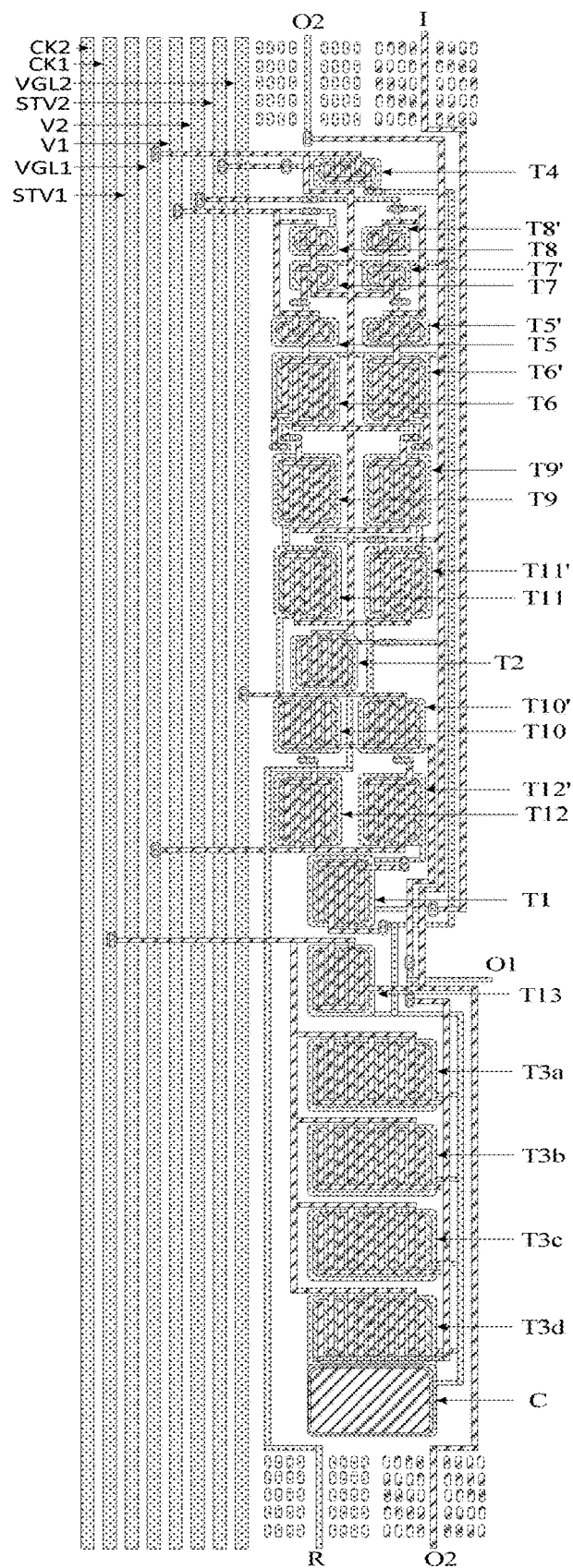
FIG. 7 is a corresponding circuit layout of a shift register in a touch substrate according to embodiments of the present disclosure.

In some embodiments of the present disclosure, the first output transistor T3 is divided into several sub-transistors connected in series together, each having a small channel width, to form a longitudinal structure, so that a matching degree of the design and the simulation can be improved, and it is beneficial to reduce the first length h1 of the shift register GOA, and implement an extremely narrow frame design. Specifically, as shown in FIGS. 6 and 7, the first output transistor T3 includes at least two sub-transistors arranged along the second direction y and connected with each other in parallel, where the term "in parallel" means that first electrodes of the sub-transistors are connected to each other and second electrodes of the sub-transistors are connected to each other. In FIG. 6, three sub-transistors T3a, T3b, and T3c are provided as an example, and in FIG. 7, four sub-transistors T3a, T3b, T3c, and T3d are provided as an example. The number of the sub-transistors is related to the required driving capability of the first output transistor T3, which will be described in detail below.

Specifically, as shown in FIG. 4, gate electrodes of the sub-transistors T3a to T3d are electrically connected to the first node N1, first electrodes of the sub-transistors T3a to T3d are electrically connected to a clock signal terminal CK, second electrodes of the sub-transistors T3a to T3d are electrically connected to a first output signal terminal O1, and the first output signal terminal O1 is electrically connected to the gate line 230.

In some embodiments of the present disclosure, a channel width W of each sub-transistor T3a, T3b, or T3c in the first direction x may be designed to be not greater than 1000 μm. In this way, on one hand, the linearity between Ion and W/L may be increased to improve the matching degree of the design and the simulation, and on the other hand, the first length h1 of the shift register GOA may be reduced, and the extremely narrow frame design can be realized in combination with the longitudinal design of the transistors of the shift registers, and a seam width in the splicing may be reduced, and the user experience may be improved.

A load delay (RC loading) of the photosensitive region AA of the touch substrate provided by the embodiments of the present disclosure is less than an RC loading of a display region of a liquid crystal display (LCD). Therefore, it is necessary to redesign a size of the TFT controlling the output of the shift register GOA in the touch substrate, i.e., the size of the first output transistor T3. If the size of the first output transistor T3 is too large, the RC of the GOA itself will be too large, and the delay of the shift register GOA farther from a clock signal line connected to the clock signal terminal CK in the cascaded shift registers GOA will be severe. If the size of the first output transistor T3 is too small, the driving capability of the shift register GOA will be insufficient. According to the simulation result, with the same panel size, the size of the first output transistor T3 of the shift register GOA in the touch substrate is about ⅓ of a size of the first output transistor T3 of the shift register GOA in the liquid crystal display panel. Taking 55 inches as an example, the optimal size of the first output transistor T3 is W/L=4000/4 μm. Therefore, as shown in FIG. 7, the first output transistor T3 may be designed to include four sub-transistors T3a, T3b, T3c, T3d arranged along the second direction y, each of which has a channel width W of 1000 μm, and a channel length of 4 μm.

Figure 8A:
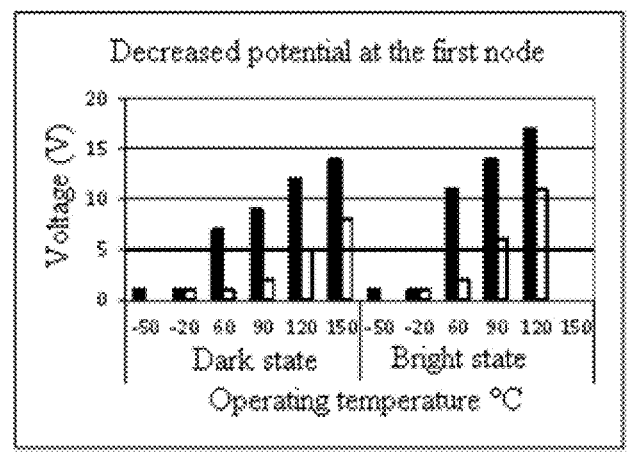
FIG. 8a is a schematic diagram showing a variation of a potential at a first node of a shift register with an operating temperature.
Figure 8B:
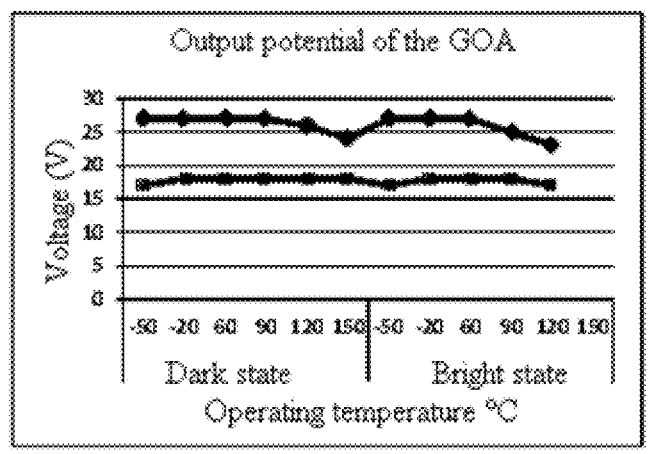
FIG. 8b is a schematic diagram showing a variation of an output potential of a shift register with an operating temperature.

Meanwhile, the shift registers GOA in the touch substrate may receive light reflected by the liquid crystal display panel from the LCD backlight with an intensity in a range from 8000 nit to 10000 nit. At this time, if the shift registers GOA are driven by the original high potential, such as a voltage of 33V, there is a serious leakage current at the first node N1 in each shift register GOA due to the excessive voltage difference between source and drain electrodes of the first output transistor T3. An output potential of the shift register GOA may be decreased as an operating temperature rises. Therefore, in some embodiments of the present disclosure, an operating voltage of the shift register GOA may be lowered appropriately, for example, a maximum amplitude of the clock signal provided by the clock signal terminal CK may be between 15V and 25V. As shown in FIG. 8a and FIG. 8b, as an example, the maximum amplitude of the clock signal provided by the clock signal terminal CK is 18V (no filling) in the present disclosure, it can be seen from a comparison with the high potential such as 27V (black filling) in the related art that for the potential of the 18V at the first node N1 in the present disclosure, in a dark state and a bright state, the potential decreases slowly as the operating temperature increases, and the output potential of the shift register GOA decreases less as the operating temperature increases.

Optionally, in the touch substrate provided in the embodiments of the present disclosure, in order to reduce a signal load output by the shift register to the gate line, as shown in FIGS. 4 and 7, each shift register GOA may further include:

a second output transistor T13; a gate electrode of the second output transistor T13 is electrically connected to the first node N1, a first electrode of the second output transistor T13 is electrically connected to the clock signal terminal CK, a second electrode of the second output transistor T13 is electrically connected to a second output signal terminal O2 configured to be electrically connected to an input signal terminal I in a shift register GOA in a next stage and a reset signal terminal R in a shift register GOA in a previous stage, respectively, that is the cascade connection of the shift registers in sequentially arranged stages is implemented through the second output transistors T13. It is noted that the cascaded shift registers in sequentially arranged stages may be arranged continuously or at intervals, which is not limited herein. The cascaded shift registers in each group are alternately connected to clock signal terminals CK1 and CK2, where clock signals provided by the clock signal terminals CK1 and CK2 have opposite phases.

Optionally, in the touch substrate provided in the embodiments of the present disclosure, the signals output by the second output transistor T13 and the first output transistor T3 have the same timing and the same amplitude but have different loads, so that the second output transistor T13 and the first output transistor T3 may be set to have different sizes. As shown in FIG. 7, the second output transistor T13 and the first output transistor T3 are arranged in the second direction y, and a channel width of the second output transistor T13 in the first direction x is less than the channel width of each of the sub-transistors T3a to T3d in the first direction x. That is the second output transistor T13 does not require a larger driving capability.

Optionally, in the touch substrate provided in the embodiments of the present disclosure, as shown in FIGS. 4 and 7, each shift register GOA may further include: an input transistor T1, a reset transistor T2, and a control circuit arranged along the second direction y.

A gate electrode and a first electrode of the input transistor T1 are electrically connected to the input signal terminal I, and a second electrode of the input transistor T1 is electrically connected to the first node N1.

A gate electrode of the reset transistor T2 is electrically connected to the reset signal terminal R, a first electrode of the reset transistor T2 is electrically connected to a first power supply signal terminal VGL1, and a second electrode of the reset transistor T2 is electrically connected to the first node N1.

The control circuit is electrically connected to the first node N1, the first output signal terminal O1, and control signal terminals V1 and V2, respectively, and configured to control potentials at the first node N1 and the first output signal terminal O1 in response to signals at the control signal terminals V1 and V2, respectively.

Optionally, in the touch substrate provided in the embodiments of the present disclosure, as shown in FIG. 4, the control circuit may include two control sub-circuits 311 and 312 electrically connected to different control signal terminals V1 and V2, and operating alternately to control the signal terminals V1 and V2, and the control signal terminals V1 and V2 switch between high and low potentials once every about 2 s to 3 s, so as to prevent the first node N1 from being in a forward bias state for a long time.

Specifically, as shown in FIG. 7, transistors of the two control sub-circuits 311 and 312 having the same function may be arranged side by side in the first direction x, and transistors of the two control sub-circuits 311 and 312 having different functions are arranged in the second direction y. For example, the control sub-circuit 311 may include: a fifth transistor T5, a sixth transistor T6, a seventh transistor T7, an eighth transistor T8, a ninth transistor T9, a tenth transistor T10, an eleventh transistor T11, and a twelfth transistor T12 arranged along the second direction y; the control sub-circuit 312 may include: a fifth transistor T5', a sixth transistor T6', a seventh transistor T7', an eighth transistor T8', a ninth transistor T9', a tenth transistor T10', an eleventh transistor T11', and a twelfth transistor T12' arranged along the second direction y. The fifth transistors T5 and T5' are disposed side by side, the sixth transistors T6 and T6' are disposed side by side, and so on.

Specifically, taking the control sub-circuit 311 as an example, the connection relationship among the transistors in the control sub-circuit 311 is as follows.

A gate electrode and a first electrode of the eighth transistor T8 are both electrically connected to a control signal terminal V1, and a second electrode of the eighth transistor T8 is electrically connected to a gate electrode of the fifth transistor T5.

A first electrode of the fifth transistor T5 is electrically connected to the control signal terminal V1, and a second electrode of the fifth transistor T5 is electrically connected to a second node N2.

A gate electrode of the sixth transistor T6 is electrically connected to the first node N1, a first electrode of the sixth transistor T6 is electrically connected to the first power supply signal terminal VGL1, and a second electrode of the sixth transistor T6 is electrically connected to the second node N2.

A gate electrode of the seventh transistor T7 is electrically connected to the first node N1, a first electrode of the seventh transistor T7 is electrically connected to the first power supply signal terminal VGL1, and a second electrode of the seventh transistor T7 is electrically connected to the gate electrode of the fifth transistor T5.

A gate electrode of the ninth transistor T9 is electrically connected to the second node N2, a first electrode of the ninth transistor T9 is electrically connected to the first power supply signal terminal VGL1, and a second electrode of the ninth transistor T9 is electrically connected to the first node N1.

A gate electrode of the tenth transistor T10 is electrically connected to the second node N2, a first electrode of the tenth transistor T10 is electrically connected to a second power supply signal terminal VGL2, and a second electrode of the tenth transistor T10 is electrically connected to the first output signal terminal O1.

A gate electrode of the eleventh transistor T11 is electrically connected to the second node N2, a first electrode of the eleventh transistor T11 is electrically connected to the first power supply signal terminal VGL1, and a second electrode of the eleventh transistor T11 is electrically connected to the second output signal terminal O2.

A gate electrode of the twelfth transistor T12 is electrically connected to the input signal terminal I, a first electrode of the twelfth transistor T12 is electrically connected to the first power supply signal terminal VGL1, and a second electrode of the twelfth transistor T12 is electrically connected to the second node N2.

The above is only an example of a specific structure of the control circuit in each shift register provided in the embodiments of the present disclosure, and in the specific implementation, the specific structure of the control circuit is not limited to the structure provided in the embodiments of the present disclosure, and may be other structures known to one of ordinary skill in the art, and is not limited herein.

Optionally, in the touch substrate provided in the embodiments of the present disclosure, as shown in FIGS. 4 and 7, each shift register GOA may further include: a fourth transistor T4, a gate electrode of the fourth transistor T4 is electrically connected to a second frame start signal terminal, a first electrode of the fourth transistor T4 is electrically connected to the first power supply signal terminal VGL1, and a second electrode of the fourth transistor T4 is electrically connected to the first node N1. The fourth transistor T4 is configured to reset the first node N1 of the shift register after the gate driving circuit is turned on.

Figure 5:
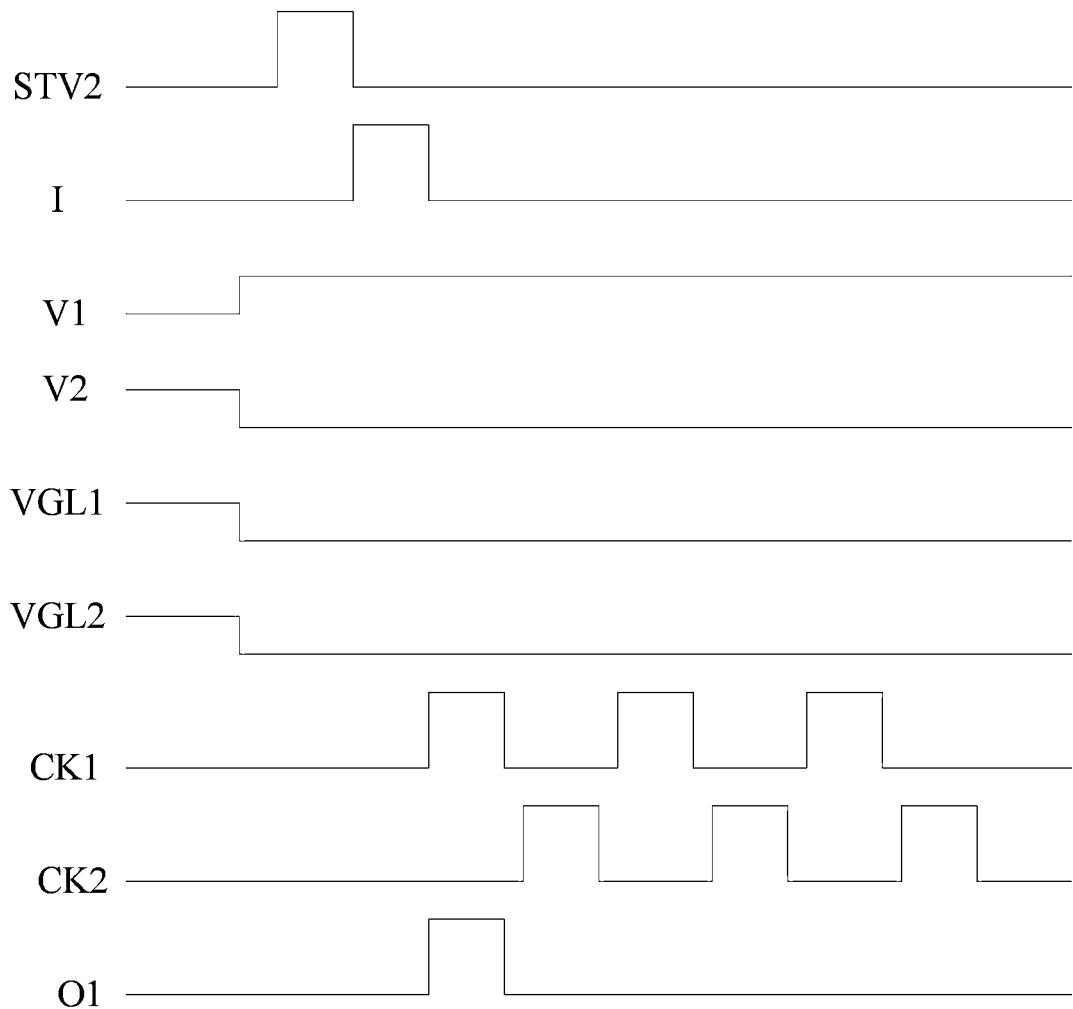
FIG. 5 is a timing diagram of corresponding signals of a shift register in a touch substrate according to embodiments of the present disclosure.

Taking the structure of the shift register shown in FIG. 4 as an example, the operation process of the shift register is briefly described with reference to the signal timing diagram shown in FIG. 5. The first frame start signal terminal STV1 is electrically connected to the input signal terminal I of the shift register in the first stage, and the input signal terminal I of the shift register in each of other stages in addition to the first stage is electrically connected to the second output signal terminal O2 of the shift register in the previous stage. After the second frame start signal terminal STV2 resets the first nodes N1 of all the shift registers, the first frame start signal terminal STV1 loads a signal to turn on the first transistor T1 of the shift register in the first stage, the potential at the first node N1 of the shift register in the first stage is pulled up, the twelfth transistor T12 is turned on, and the potential at the second node N2 is pulled down. The first node N1 of the high potential turns on the first output transistor T3 and the second output transistor T13, and the first output signal terminal O1 and the second output signal terminal O2 output a high level when the clock signal loaded by the clock signal terminal CK1 is at the high potential. The high level at the second output signal terminal O2 is input to the input signal terminal of the shift register in the next stage, and when the second output signal terminal O2 of the shift register in the next stage outputs a high level signal, the reset transistor T2 of the shift register in the present stage is turned on, and thus, the first node N1 is pulled down, and thus, the sixth transistor T6 and the seventh transistor T7 are turned off; the fifth transistor T5 is turned on, and thus, the potential of the second node N2 is pulled up, and thus, the tenth transistor T10 and the eleventh transistor T11 are turned on, and thus, the potentials of the first output signal terminal O1 and the second output signal terminal O2 are pulled down.

Figure 9:
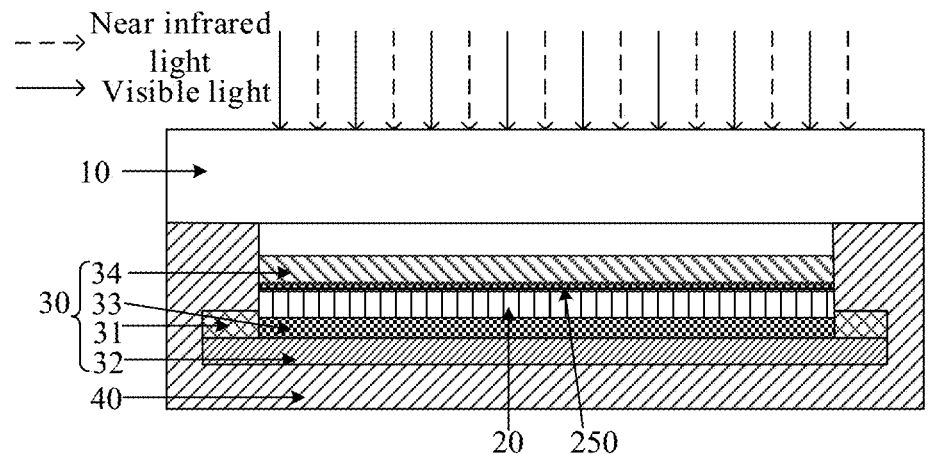
FIG. 9 is a schematic diagram of a structure of a display apparatus according to embodiments of the present disclosure.

Based on the same inventive concept, embodiments of the present disclosure further provide a display apparatus, as shown in FIG. 9, including: a display module 10, and at least one touch substrate 20 provided in the embodiments of the present disclosure, the touch substrate 20 is located on a side of the display module 10 away from the display surface. As the principle of the display apparatus for solving the problems is similar to that of the touch substrate, the implementation of the display apparatus provided by the embodiments of the present disclosure can refer to the implementation of the touch substrate provided by the embodiments of the present disclosure, and repeated descriptions are omitted.

Figure 10:
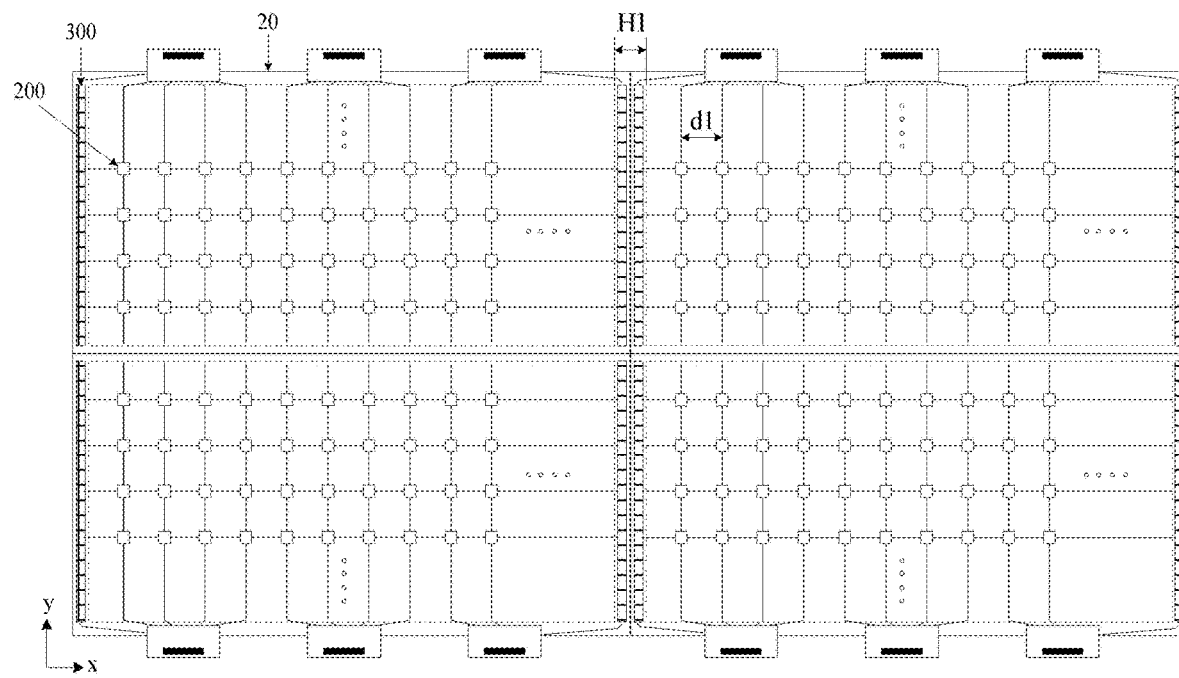
FIG. 10 is a schematic diagram of a structure obtained by splicing touch substrates in a display apparatus according to embodiments of the present disclosure.

In some embodiments of the present disclosure, in the application of the large-sized panel, as shown in FIG. 10, a plurality of the touch substrates 20 may be included and closely arranged. In FIG. 10, as an example, the four touch substrates 20 are spliced together for description. Each gate driving circuit 300 in the frame region BB is designed longitudinally, so that a splicing width between two touch substrates 20 adjacent to each other on the left and right sides can be reduced to be substantially the same as the size of each photosensitive pixel 200. That is a sum H1 of widths of the frame regions of two touch substrates 20 adjacent to each other in the first direction x is less than the center-to-center distance d1 between two photosensitive pixels 200 adjacent to each other in the first direction x, so that a user does not experience discontinuity in the touch control.

In some embodiments of the present disclosure, in the display apparatus provided in the embodiments of the present disclosure, the display module 10 may be a liquid crystal display module (LCD), and may specifically a twisted nematic (TN) type liquid crystal display, an advanced dimension switch (ADS) type liquid crystal display, a high-advanced dimension switch (HADS) type liquid crystal display, an in-plane switch (IPS) type liquid crystal display, or the like, which is not particularly limited herein. Other essential components in the liquid crystal display module should be understood by one of ordinary skill in the art to exist and therefore are not described herein, and should not be construed as a limitation to the present disclosure.

In some embodiments of the present disclosure, as shown in FIG. 9, the display apparatus provided in the embodiments of the present disclosure may further include a backlight module 30, the display module 10 is located at a light outgoing side of the backlight module 30, and the touch substrate 20 is located in the backlight module 30.

In some embodiments of the present disclosure, the backlight module 30 may include a reflective sheet 32, a light guide plate 33, and a diffusion sheet 34 which are stacked, and a backlight source 31, where the backlight source 31 may be located on at least one side of the light guide plate 33, and the touch substrate may be located between the light guide plate 33 and the diffusion sheet 34. The light emitted from the backlight source 31 enters the light guide plate 33 from the side of the light guide plate 33, is diffused by the light guide plate 33 and reflected by the reflective sheet 32, passes through the touch substrate 20 and the diffusion sheet 34 and then uniformly enters the liquid crystal display module.

In some embodiments of the present disclosure, in order not to prevent the detection of the non-visible light (e.g., the near infrared light) by the non-visible light sensors 210 from being affected, the reflector 32 may be configured to reflect the visible light and transmit the non-visible light (e.g., the near infrared light).

In some embodiments of the present disclosure, in the display apparatus provided in the embodiments of the present disclosure, the display module 10 may be an electroluminescence display module, such as an organic light emitting diode display module (OLED), a quantum dot light emitting display module (QLED), a mini/micro light emitting display module (mini/micro LED), or the like. Components essential to the electroluminescence display module should be understood by one of ordinary skill in the art to be existing and thus, are not described herein, and should not be construed as a limitation to the present disclosure.

In some embodiments of the present disclosure, as shown in FIG. 9, the display apparatus provided in the embodiments of the present disclosure may further include a support frame 40 for protecting and supporting the display module 10, the touch substrate 20, the backlight module 30, and the like. Other essential components in the display apparatus should be understood by one of ordinary skill in the art to exist and therefore are not described herein, and should not be construed as a limitation to the present disclosure.

Figure 11:
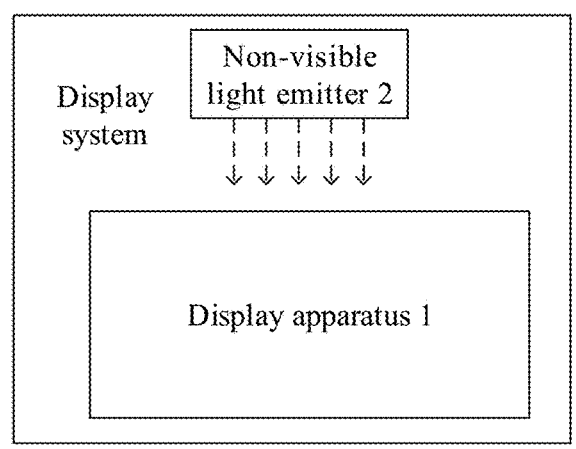
FIG. 11 is a schematic diagram of a structure of a display system according to embodiments of the present disclosure.

Based on the same inventive concept, embodiments of the present disclosure further provide a display system, as shown in FIG. 11, which may include a display apparatus 1 and a non-visible light emitter 2, where the display apparatus 1 is the above display apparatus provided by the embodiments of the present disclosure. Because the principle of the display system for solving the problems is similar to that of the display apparatus, the implementation of the display system provided by the embodiments of the present disclosure can refer to the implementation of the display apparatus provided by the embodiments of the present disclosure, and repeated descriptions are omitted.

In a specific implementation, the non-visible light emitted by the non-visible light emitter 2 is projected on the display apparatus 1, and a large light spot may cover the non-visible sensors 210, so that the conversion of an optical signal to an electrical signal can be realized by the non-visible sensors 210, and a touch position is determined by processing the electrical signal, thereby realizing the remote touch interaction.

It will be apparent to one of ordinary skill in the art that, various changes and modifications may be made in the embodiments of the present disclosure without departing from the spirit and scope of the present disclosure. Thus, if such changes and modifications of the embodiments of the present disclosure are within the scope of the claims and their equivalents of the present disclosure, the present disclosure is also intended to encompass such changes and modifications.

What is claimed is:

1. A touch substrate, comprising:
a base substrate comprising a photosensitive region and a frame region surrounding the photosensitive region;
a plurality of photosensitive pixels in an array in the photosensitive region, wherein each of the plurality of photosensitive pixels comprises a non-visible light sensor and a driving transistor; and
at least one gate driving circuit in the frame region, wherein each of the at least one gate driving circuit comprises a plurality of cascaded shift registers, an output terminal of each shift register is electrically connected to gate electrodes of driving transistors in at least one row of photosensitive pixels through at least one gate line, which extends along a first direction;
wherein each shift register comprises a plurality of transistors; and in each shift register, the number of transistors arranged along a second direction is greater than the number of transistors arranged along the first direction, and the second direction is substantially perpendicular to the first direction;
wherein each shift register has a first length in the first direction and a second length in the second direction, and the first length is less than the second length; and
wherein the at least one gate driving circuit comprises two gate driving circuits in the frame region on both sides of an extending direction of the at least one gate line; and the first length is less than half of a distance between centers of two adjacent photosensitive pixels in the first direction.

2. The touch substrate of claim 1, wherein the second length is substantially equal to a distance between centers of two adjacent photosensitive pixels in the second direction.

3. The touch substrate of claim 2, wherein the distance between the centers of two adjacent photosensitive pixels in the first direction and the distance between the centers of two adjacent photosensitive pixels in the second direction each is in a range from 3 mm to 5 mm.

4. The touch substrate of claim 1, wherein a width direction of a channel region of each transistor in each shift register extends along the first direction, and a length direction of the channel region extends along the second direction.

5. The touch substrate of claim 1, wherein each shift register comprises: a first output transistor comprising at least two sub-transistors arranged along the second direction and connected with each other in parallel; and
a gate electrode of each sub-transistor is electrically connected to a first node, a first electrode of each sub-transistor is electrically connected to a clock signal terminal, a second electrode of each sub-transistor is electrically connected to a first output signal terminal, and the first output signal terminal is electrically connected to a corresponding gate line.

6. The touch substrate of claim 5, wherein a channel width of each sub-transistor in the first direction is not greater than 1000 um.

7. The touch substrate of claim 5, wherein a maximum amplitude of a clock signal provided by the clock signal terminal is between 15V and 25V.

8. The touch substrate of claim 5, wherein each shift register further comprises: an input transistor, a reset transistor, and a control circuit arranged along the second direction;
a gate electrode and a first electrode of the input transistor are both electrically connected to an input signal terminal, and a second electrode of the input transistor is electrically connected to the first node;
a gate electrode of the reset transistor is electrically connected to a reset signal terminal, a first electrode of the reset transistor is electrically connected to a first power supply signal terminal, and a second electrode of the reset transistor is electrically connected to the first node; and
the control circuit is electrically connected to the first node, the first output signal terminal, and at least one control signal terminal, respectively, and is configured to control potentials at the first node and the first output signal terminal in response to a signal at the at least one control signal terminal.

9. The touch substrate of claim 8, wherein the control circuit comprises two control sub-circuits, the at least one control terminal comprises two different control signal terminals, and the two control sub-circuits are electrically connected to the different control signal terminals, respectively, transistors with a same function in the two control sub-circuits are arranged side by side in the first direction, and transistors with different functions in the two control sub-circuits are arranged in the second direction.

10. The touch substrate of claim 8, wherein each shift register further comprises: a second output transistor; and
a gate electrode of the second output transistor is electrically connected to the first node, a first electrode of the second output transistor is electrically connected to the clock signal terminal, a second electrode of the second output transistor is electrically connected to a second output signal terminal, which is configured to be electrically connected to an input signal terminal in a shift register of a next stage and a reset signal terminal in a shift register of a previous stage.

11. The touch substrate of claim 10, wherein the second output transistor and the first output transistor are arranged along the second direction, and a channel width of the second output transistor in the first direction is less than a channel width of each sub-transistor in the first direction.

12. The touch substrate of claim 1, further comprising:
at least one read circuit arranged in the frame region and located at a side different from a side where the at least one gate driving circuit is located, wherein each of the at least one read circuit is electrically connected to first electrodes of driving transistors in at least one column of photosensitive pixels of the plurality of photosensitive pixels through at least one corresponding data line extending along the second direction.

13. The touch substrate of claim 1, further comprising: a non-visible light antireflection film on a side of the non-visible light sensor away from the base substrate, and completely covering the photosensitive region; and
the non-visible light antireflection film is made of a black matrix material which selectively transmits non-visible light.

14. A display apparatus, comprising:
a display module; and
at least one touch substrate, each of which is the touch substrate of claim 1, wherein the at least one touch substrate is on a side of the display module away from a display surface.

15. The display apparatus of claim 14, wherein the at least one touch substrate comprises a plurality of touch substrates which are arranged adjacent to each other, and a sum of widths of frame regions of two adjacent touch substrates in the first direction is less than a distance between centers of two adjacent photosensitive pixels in the first direction.

16. The display apparatus of claim 14, further comprising a backlight module;
wherein the display module is a liquid crystal display module, the display module is located on a light outgoing side of the backlight module, and the at least one touch substrate is located in the backlight module.

17. The display apparatus of claim 16, wherein the backlight module comprises: a reflective sheet, a light guide plate, and a diffusion sheet which are stacked together, and a backlight source; and
the backlight source is on at least one side of the light guide plate, and the touch substrate is between the light guide plate and the diffusion sheet.

18. A display system, comprising a display apparatus, which is the display apparatus of claim 14, and a non-visible light emitter.

* * * * *